US006909470B2

(12) United States Patent
Mizukami et al.

(10) Patent No.: US 6,909,470 B2
(45) Date of Patent: *Jun. 21, 2005

(54) DIGITAL BROADCAST RECORDER

(75) Inventors: Hiroyuki Mizukami, Yokohama (JP);
Yutaka Igarashi, Yokohama (JP);
Toshio Nagashima, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/338,684

(22) Filed: Jan. 9, 2003

(65) Prior Publication Data

US 2003/0099458 A1 May 29, 2003

Related U.S. Application Data

(63) Continuation of application No. 09/320,712, filed on May 27, 1999, now Pat. No. 6,657,678, which is a continuation of application No. 08/695,507, filed on Aug. 12, 1996, now Pat. No. 5,956,098, which is a continuation of application No. 08/386,038, filed on Feb. 9, 1995, now Pat. No. 5,572,264.

(30) Foreign Application Priority Data

Feb. 14, 1994 (JP) .............................................. 6-17072
Oct. 19, 1994 (JP) ............................................ 6-253466

(51) Int. Cl.[7] ............................ H04N 5/46; H04N 5/44
(52) U.S. Cl. .................. 348/726; 348/725; 455/245.2; 455/207; 455/189.1; 375/316
(58) Field of Search ............................... 348/725, 726, 348/735, 731; 455/313, 314, 315, 316; 375/324, 340, 316, 332, 327

(56) References Cited

U.S. PATENT DOCUMENTS 4,061,980 A * 12/1977 Sato ......................... 455/158.3
4,237,487 A   12/1980 Ikeda et al. ................. 348/725
4,562,472 A   12/1985 Carlson ...................... 348/737

(Continued)

FOREIGN PATENT DOCUMENTS

DE          31 08 901         9/1982

(Continued)

OTHER PUBLICATIONS

Abstract of Japanese Patent Application Laid–Open No. 02–234518, Sep. 17, 1990, Nobori Mitsuhiro.
Abstract of Japanese Patent Application Laid–Open No. 01–300717, Dec. 5, 1989, Kubo Kazuhiko et al.

(Continued)

*Primary Examiner*—Michael H. Lee
(74) *Attorney, Agent, or Firm*—Kenyon & Kenyon

(57) ABSTRACT

A digital broadcast recorder capable of recording digital television (TV) signals includes a first frequency converter which converts a received digitally modulated TV signal into a first intermediate frequency signal having a frequency lower than that of the digitally modulated TV signal, the first intermediate frequency signal having a frequency in a standard TV band and useable in demodulating standard TV signals, a band-pass filter coupled to the first frequency converter, which selectively passes-through the first intermediate frequency signal, a phase-lock loop (PLL) circuit coupled to the first frequency converter, which controls an oscillation frequency of a local oscillator in the first frequency converter, a second frequency converter coupled to the band-pass filter, which converts the first intermediate frequency signal passed through the band-pass filter into a second intermediate frequency signal lower in frequency than said first intermediate frequency signal a digital demodulator coupled to the second frequency converter, which demodulates the second intermediate frequency signal as converted by the second frequency converter and a writer coupled to the digital demodulator, which records demodulated signal as demodulated by said digital demodulator in a recording medium.

15 Claims, 8 Drawing Sheets

U.S. PATENT DOCUMENTS

| | | | |
|---|---|---|---|
| 4,581,643 A | 4/1986 | Carlson | 348/735 |
| 4,696,056 A | 9/1987 | Morita | 455/182 |
| 4,789,897 A | 12/1988 | Kappeler et al. | 348/726 |
| 4,814,887 A | 3/1989 | Marz et al. | 348/735 |
| 4,831,694 A | 5/1989 | Kong | 24/265 |
| 4,855,835 A | 8/1989 | Tobita | 348/735 |
| D303,233 S | 9/1989 | Jang | D11/216 |
| D310,448 S | 9/1990 | Scognamillo et al. | D11/216 |
| 5,014,349 A | 5/1991 | Kubo et al. | 455/189 |
| 5,200,826 A | 4/1993 | Seong | 348/735 |
| 5,230,095 A * | 7/1993 | Onodera et al. | 455/209 |
| 5,239,306 A | 8/1993 | Siwiak et al. | |
| D340,886 S | 11/1993 | Anscher | D11/218 |
| D341,105 S | 11/1993 | Lovato | D11/218 |
| 5,283,653 A | 2/1994 | Citta | 348/725 |
| 5,390,346 A | 2/1995 | Marz | 348/735 |
| 5,418,815 A | 5/1995 | Ishikawa et al. | |
| D364,125 S | 11/1995 | Anscher | D11/216 |
| 5,548,831 A | 8/1996 | Bijker et al. | 455/207 |
| 5,606,579 A * | 2/1997 | Patel et al. | 375/321 |
| 5,878,087 A * | 3/1999 | Ichihara | 375/316 |
| 5,956,098 A * | 9/1999 | Mizukami et al. | 348/735 |

FOREIGN PATENT DOCUMENTS

| | | | |
|---|---|---|---|
| EP | 0 527 289 | 2/1993 | |
| EP | 0 573 247 | 12/1993 | |
| EP | 0 574 273 | 12/1993 | |
| EP | 0 574 901 | 12/1993 | |
| JP | 61-33274 | 5/1974 | H04N/5/46 |
| JP | 56-102123 | 11/1981 | |
| JP | 63-077209 | 4/1988 | |
| JP | 63-76588 | 6/1988 | |
| JP | 63-76592 | 6/1988 | |
| JP | 3-106188 | 5/1991 | |
| JP | 04-369189 | 12/1992 | |
| JP | 06-013847 | 1/1994 | |
| WO | WO90/04893 | 5/1990 | |
| WO | WO91/15925 | 10/1991 | |
| WO | WO93/16553 | 8/1993 | |
| WO | WO93/19543 | 9/1993 | |
| WO | WO 94/00923 | 1/1994 | |

OTHER PUBLICATIONS

Abstract of Japanese Patent Application Laid–Open No. 01–236736, Sep. 21, 1989, Nagashima Toshio et al.

Abstract of Japanese Patent Application Laid–Open No. 63–076592, Apr. 6, 1988, Noda Tsutomu et al.

IEEE Transactions on Consumer Electronics, vol. 36, No. 3, Aug. 30, 1990, New York, US, pp. 407–413, M. McGinn: *An Advanced I.F. Amplifier & AFT System Suitable for HDTV*.

Patent Abstracts of Japan, JP 05–176331, Jul. 13, 1993, Hitachi Ltd. filed Dec. 24, 1991.

Patent Abstracts of Japan, JP 05–048490, Feb. 26, 1993, Toshiba Corp., filed Aug. 9, 1991.

* cited by examiner

DIGITAL BROADCAST RECORDER

This is a continuation of application Ser. No. 09/320,712 filed 27 May 1999, now U.S. Pat. No. 6,657,678, which is a continuation of application Ser. No. 08/695,507 filed 12 Aug. 1996, now U.S. Pat. No. 5,956,098, which is a continuation of application Ser. No. 08/386,038 filed 9 Feb. 1995, now U.S. Pat. No. 5,572,264.

BACKGROUND OF THE INVENTION

The present invention relates to a receiver which can receive a high definition TV signal and more particularly to a high definition TV signal receiver which can receive a high definition TV signal which is compressed to a band width which is the same as that of a TV signal of the standard system such as the NTSC system and a TV signal of the standard system even when they are multiplexed and transmitted within the co-channel.

Furthermore, the present invention relates to a high definition TV signal receiver which can selectively receive a high definition TV signal and a standard TV signal and relates to a high definition TV signal receiver which can share and receive a high definition TV signal which is compressed to a band width which is the same as that of a TV signal of the standard system and a TV signal of the standard system (a TV signal of not only the NTSC system but also another standard system which is modulated in amplitude is included).

As television broadcasting and CATV broadcasting have been expanded recently, broadcasting channels are being multiplexed. In correspondence with it, to reduce image interferences and reception interferences due to leakage of a local oscillation signal even at the time of multi-channel reception, a receiver of the double super-heterodyne system is used.

However, the aforementioned prior art is used to receive a TV signal of the standard system such as the NTSC system and reception of a signal which is digitally modulated such as a high definition TV signal is not taken into account. Multiplexing and transmission of a TV signal of the standard system and a high definition TV signal in the co-channel are neither taken into account.

SUMMARY OF THE INVENTION

An object of the present invention is to provide a high definition TV signal receiver which can selectively receive one of a TV signal of the standard system and a high definition TV signal.

To accomplish the above object, the present invention uses the double super-heterodyne system as a basic constitution so as to receive a high definition TV signal, uses a band pass filter having a flatness in pass band characteristics and a small deviation of group delay characteristics which prevent the demodulation of a high definition TV signal from degradation as a first intermediate frequency filter, uses a high definition TV signal filter (surface acoustic wave filter, etc.) as a second intermediate frequency filter, installs a third mixer for converting a high definition TV signal to a third intermediate frequency signal, and installs a high definition TV signal demodulator in the demodulation section.

To share and receive a high definition TV signal and a TV signal of the standard system, the present invention uses the double super-heterodyne system as a basic constitution, uses a band pass filter having a flatness in pass band characteristics and a small deviation of group delay characteristics which prevent the demodulation of a high definition TV signal from degradation as a first intermediate frequency filter, uses a high definition TV signal filter and a filter (surface acoustic wave filter, etc.) for a TV signal of the standard system such as a TV signal of the NTSC system as a second intermediate frequency filter, installs a third mixer for converting a high definition TV signal to a third intermediate frequency signal, installs a high definition TV signal demodulator in the demodulation section, and an AM demodulator for a TV signal of the standard system in the demodulation section.

Furthermore, to share and receive a high definition TV signal and a TV signal of the standard system, the present invention uses the double super-heterodyne system as a basic constitution, uses a band pass filter having a flatness in pass band characteristics and a small deviation of group delay characteristics which prevent the demodulation of a high definition TV signal from degradation as a first intermediate frequency filter, uses a high definition TV signal filter as a second intermediate frequency filter, installs a third mixer for converting a high definition TV signal to a third intermediate frequency signal, and installs a common demodulator for a high definition TV signal and a TV signal the standard system in the demodulation selection.

The present invention having the aforementioned constitution can selectively select a TV signal of the standard system and a high definition TV signal even when they are multiplexed and transmitted in the co-channel or even when they are transmitted independently.

The embodiments of the present invention will be explained hereunder with reference to the accompanying drawings. An example of a TV signal of the NTSC system (hereinafter referred to as just an NTSC signal) will be used for explanation as a TV signal of the standard system.

Figure 1:
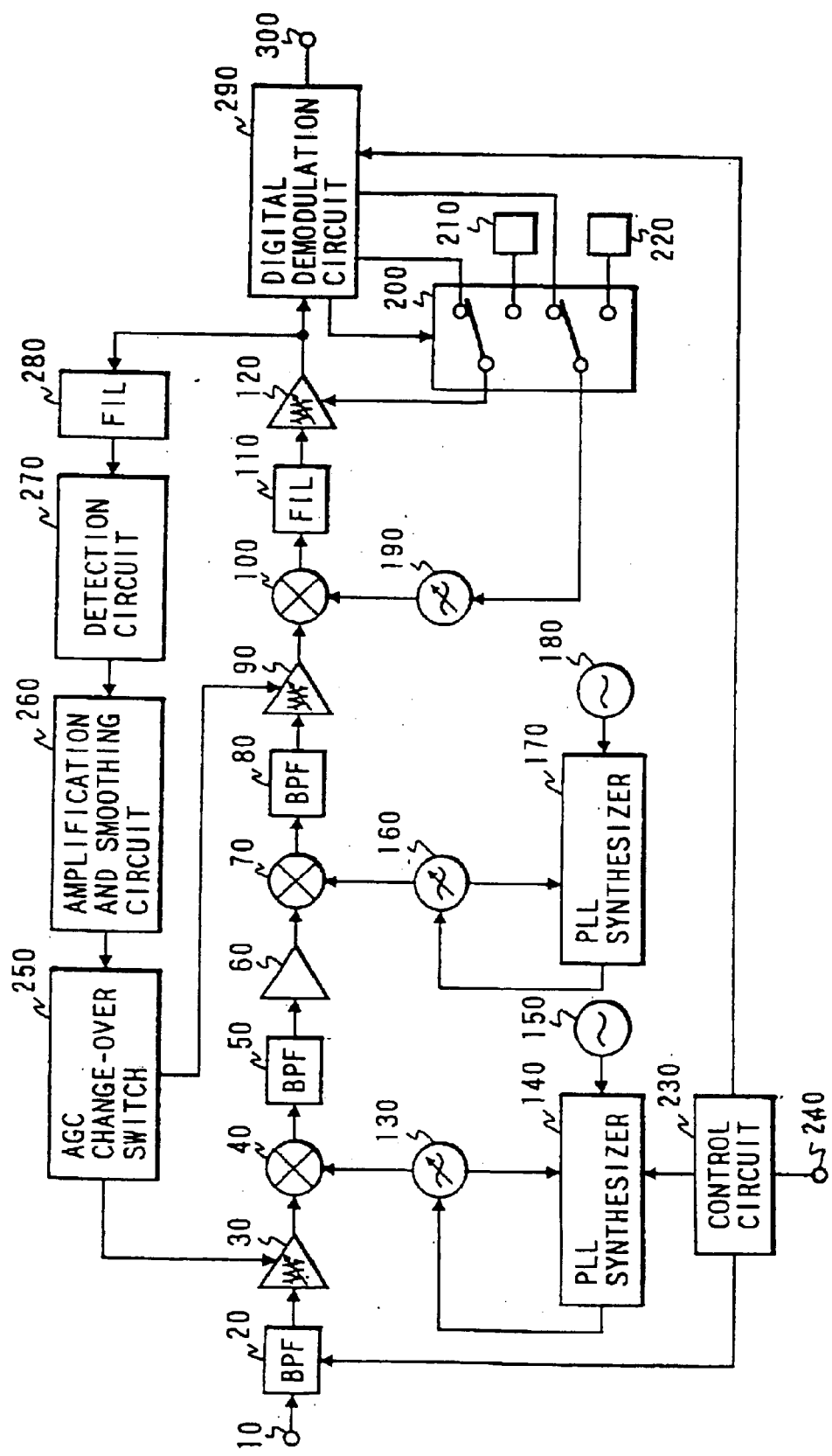
FIG. 1 is a block diagram showing the first embodiment of the high definition TV signal receiver of the present invention.

FIG. 1 is a block diagram showing the first embodiment of the high definition TV signal receiver of the present invention. Numeral 10 indicates a TV signal input terminal, 20 an input filter, 30 a variable gain amplifier, 40 a mixer, 50 an intermediate frequency filter, 60 an intermediate frequency amplifier, 70 a mixer, 80 an intermediate frequency filter, 90 an intermediate frequency variable gain amplifier, 100 a mixer, 110 an intermediate frequency filter, 120 an intermediate frequency variable gain amplifier, 130 a local oscillator, 140 a PLL synthesizer, 150 a standard oscillator, 160 a local oscillator, 170 a PLL synthesizer, 180 a standard oscillator, 190 a local oscillator, 200 a change-over switch, 210 and 220 fixed value generation circuits, 230 a control circuit, 240 a channel selection signal input terminal, 250 an AGC change-over switch, 260 an amplification and smoothing circuit, 270 a detection circuit, 280 a filter, 290 a high definition TV signal demodulator, and 300 a high definition TV signal output terminal.

In the drawing, the digitized high definition TV signal is compressed in data digitally modulated by QAM (quadrature amplitude modulation), QPSK (quadrature phase shift keying), or OFDM (orthogonal frequency division multiplexing), and has a band width which is almost equal to that of an ordinary TV signal. This high definition TV signal is inputted from the input terminal 10 and divided into a VHF band and UHF band by the input filter 20 (furthermore, the VHF band may be divided into a low band, medium band, and high band) and only signals in the band including the desired channel are extracted and supplied to the variable gain amplifier 30.

The input filter 20 is controlled in the control circuit 230 so as to become a suitable pass band by a channel selection signal which is inputted from the input terminal 240. The number of channels to be supplied to the variable gain amplifier 30 is reduced by the input filter 20. By doing this, mutual modulation interferences between input signals which are generated in the subsequent circuits can be reduced.

A signal whose band is restricted by the input filter 20 is amplified or attenuated to a suitable signal level by the variable gain amplitude 30 and then supplied to the mixer 40.

On the other hand, the local oscillator 130 is controlled by the control circuit 230 and the PLL synthesizer 140 so as to oscillate at the frequency corresponding to the desired channel by the channel selection signal which is inputted from the input terminal 240. The PLL synthesizer 140 compares an oscillation signal having a stable frequency from the standard oscillator 150 which is divided and an oscillation signal from the local oscillator 130 which is divided and controls the oscillation frequency of the local oscillator 130 that the error thereof becomes zero. When the dividing ratio thereof is changed suitably by the control circuit 230, the local oscillator 130 can oscillate at the frequency corresponding to the desired channel.

The mixer 40 mixes an output signal of the variable gain amplifier 30 and a local oscillation signal from the local oscillator 130 and outputs a first intermediate frequency signal. The frequency of this first intermediate frequency signal is set to more than the upper limit of the terrestrial broadcasting band of an NTSC signal or the CATV broadcasting band so as to reduce image interferences and to prevent reception interferences due to leakage of a local oscillation signal. For example, in the frequency allocation in Japan and USA, the 960 MHz band, 1200 MHz band, 1700 MHz band, 2600 MHz band, or 3000 MHz band is used.

The intermediate frequency filter 50 extracts only the desired channel of this intermediate frequency signal and supplies it to the intermediate frequency amplifier 60. The intermediate frequency filter 50 is a band pass filter having a flatness in pass band characteristics and a small deviation of group delay characteristics which prevent the demodulation of a high definition TV signal from degradation and a dielectric resonant filter or a surface acoustic wave filter is used. The output signal of the intermediate frequency filter 50 is amplified by the intermediate frequency amplifier 60, supplied to the mixer 70, and mixed with a local oscillation signal from the local oscillator 160 so as to be switched to a second intermediate frequency signal.

The frequency of the second intermediate frequency signal is set to a frequency which is the same as that when a TV signal of the current standard system is received. Concretely, in USA, it is a 45 MHz band which is the same as that when an NTSC signal is received. In Japan, it is a 58 MHz band.

The local oscillator 160 is controlled by the PLL synthesizer circuit 170. The PLL synthesizer 140 compares an oscillation signal having a stable frequency from the standard oscillator 180 which is divided and an oscillation signal from the local oscillator 160 which is divided and controls the oscillation frequency of the local oscillator 160 so that the error thereof becomes zero.

For the second intermediate frequency signal, only the desired channel is extracted by the intermediate frequency filter 80 and the signal is amplified or attenuated by the intermediate frequency variable gain amplification circuit 90 so as to be set to the desired signal level and then inputted to the mixer 100.

The intermediate frequency filter 80 also requires a flatness in pass band and a small deviation of group delay which prevent the demodulation characteristics of a high definition TV signal from degradation and it is necessary to eliminate interferences from the neighboring channel, so that the intermediate frequency filter 80 consists of a surface acoustic wave filter or others so as to pass only the band of the desired receiving channel.

The mixer 100 mixes an output signal of the intermediate frequency amplifier 90 and a local oscillation signal from the local oscillator 190 and outputs a third intermediate frequency signal. The third intermediate frequency signal is lower in frequency than the second intermediate frequency signal and when the frequency almost coincides with the symbol rate of a high definition TV signal, the demodulation circuit is simplified. As described later, when the frequency band is set to a frequency band in which the FM modulation necessary to write on a recording medium such as a magnetic tape or optical disk can be easily executed, the write circuit is simplified. When the frequency of the third intermediate frequency signal is set low, various signal processing can be executed easily by using an operation amplifier which can process an analog signal with high precision as an amplifier installed on the subsequent stage of the mixer 100 or by converting an analog signal to a digital signal.

The third intermediate frequency signal is supplied to the intermediate frequency filter 110 and only a signal of the desired channel is extracted, amplified or attenuated by the intermediate frequency variable gain amplifier 120 so as to be set to the desired signal level, and then demodulated to a high definition TV signal by the high definition TV signal demodulator 290 and outputted from the output terminal 300. An oscillation frequency fine tuning signal of the local oscillator 190 and a gain control signal of the intermediate frequency variable gain amplifier 120 are outputted from the high-definition TV signal demodulator 290.

An analog digital converter, which is not shown in the drawing, for converting an analog signal to a digital signal between the intermediate frequency variable gain amplifier 120 and the high definition TV signal demodulator 290 may be installed. In this case, when the level of an input signal of the analog digital converter is changed, the quantization error is changed and the normal operation of the demodulator may be disturbed. However, since the intermediate frequency variable gain amplifier 120 is installed, the gain is finely tuned so as to keep the amplitude level unchanged.

When the power is turned on or the channel is changed, the operation of the high definition TV signal demodulator 290 is not stable, so that an oscillation frequency fine tuning signal of the local oscillator 190 and a gain control signal of the intermediate frequency variable gain amplifier 120 may not be as specified. Therefore, these control signals are interrupted by the change-over switch 210 and in place of it, an output signal of the fixed value generation circuit 210 becomes a gain control signal of the intermediate frequency variable gain amplifier 120 and an output signal of the fixed value generation circuit 220 becomes a frequency fine tuning signal of the local oscillator 190.

When the channel is changed, the control circuit 230 sends a signal indicating that the channel is changed to the high definition TV signal demodulator 290. By doing this, the high definition TV signal demodulator 290 enters the initial state and the demodulation can start smoothly.

A high definition TV signal outputted from the output terminal 300 is subjected to data decompression processing, and an image and voice are processed variously, and the signal is displayed on a display unit which is not shown in the drawing.

An output signal of the intermediate frequency variable gain amplifier 120 is also supplied to the filter 280 and only the desired band is, extracted, detected by the detection circuit 270, and subjected to suitable amplification and smoothing processing by the amplification and smoothing circuit 260 so as to form a gain control signal. This gain control signal is supplied to one of the variable gain amplifier 30 and the intermediate frequency variable gain amplifier 90 as a gain control signal by the AGC change-over switch 250.

When the signal level of the third intermediate frequency signal from the intermediate frequency variable gain amplifier 120 is increased, a gain control signal which is obtained by the filter 280, the detection circuit 270, and the amplification and smoothing circuit 260 is supplied to the intermediate frequency variable gain amplifier 90 by the AGC change-over switch 250. After the gain attenuation amount of the intermediate frequency variable gain amplifier 90 is maximized, the AGC change-over switch 250 supplies the gain control signal to the variable gain amplifier 30.

When the signal level of the third intermediate frequency signal is decreased, the gain control signal is supplied to the variable gain amplifier 30 by the AGC change-over switch 250. After the gain of the variable gain amplifier 30 is maximized, this gain control signal is supplied to the intermediate frequency variable gain amplifier 90 and the gain of the intermediate frequency variable gain amplifier 90 is increased.

By controlling the gain by the variable gain amplifier on the subsequent stage, the noise figure of the whole receiver can be prevented from degradation.

The gain control signal to the variable gain amplifier 30 is detected at a comparatively long time constant, and the gain control signal to the intermediate frequency variable gain amplifier 90 is set to a comparatively short time constant, and when the signal level is changed in a short period like a flutter by an airplane, the intermediate frequency variable gain amplifier 90 on the subsequent stage follows the change thereof.

The pass band of the filter 280 is set in the section in which the video carrier on a high level of an NTSC signal which may be transmitted through the co-channel is excluded. By doing this, when a high definition TV signal is received, the gain change of the receiver due to an NTSC signal which is transmitted through the co-channel is reduced. A band pass filter or notch filter is used for the filter 280.

For a high definition TV signal, the fact that it is transmitted through the co-channel along with an NTSC signal is taken into account. To avoid interferences from the NTSC signal, the spectrum of high definition TV signal is not arranged in the neighborhood of a video and an audio carrier and a chromatic subcarrier on a high level of the NTSC signal. Therefore, it is necessary to install a notch filter for eliminating the carrier and subcarrier of the NTSC signal in the high definition TV signal demodulator 290.

As mentioned above, in this embodiment, to pass a high definition TV signal through the intermediate frequency filters 50 and 80, a band pass filter having a flatness in pass band and a small deviation of group delay which prevent the demodulation characteristics of the high definition TV signal from degradation is used.

When the second intermediate frequency signal is converted to the third intermediate frequency signal having a lower frequency by the mixer 100, various signal processing can be executed easily by using an operation amplifier which can process an analog signal with high precision on the subsequent stage of the mixer 100 or by converting an analog signal to a digital signal.

Furthermore, by using the filter 280 for eliminating the carrier part on a high level of a TV signal of the standard system such as an NTSC signal which may be transmitted through the co-channel when a gain control signal is detected, even 20 when the two signals are transmitted through the co-channel, the gain control error can be reduced and the desired high definition TV signal can be demodulated.

By doing this, even when a TV signal of the standard system such as an NTSC signal and a high definition TV signal are transmitted through the co-channel, the cross modulation by the two signals can be reduced and the high definition TV signal can be demodulated at a low error rate.

Figure 2:
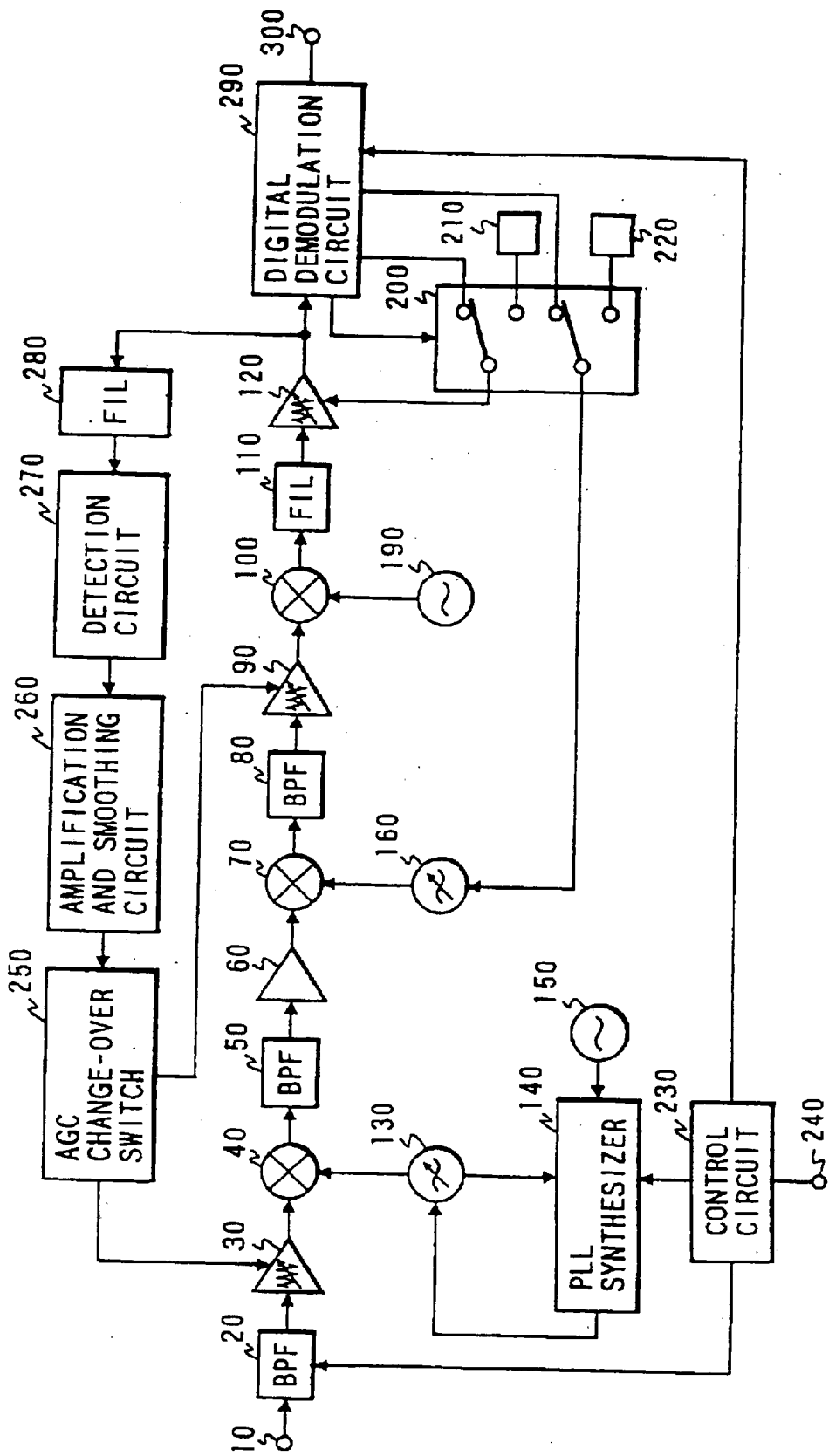
FIG. 2 is a block diagram showing the second embodiment of the high definition TV signal receiver of the present invention.

FIG. 2 is a block diagram showing the second embodiment of the high definition TV signal receiver of the present invention. The same numeral is assigned to each part corresponding to FIG. 1 so as to omit duplicate explanation. In this embodiment, the oscillation frequency of the local oscillator 160 is finely tuned by an oscillation frequency fine tuning signal from the high definition TV signal demodulator 290.

Figure 3:
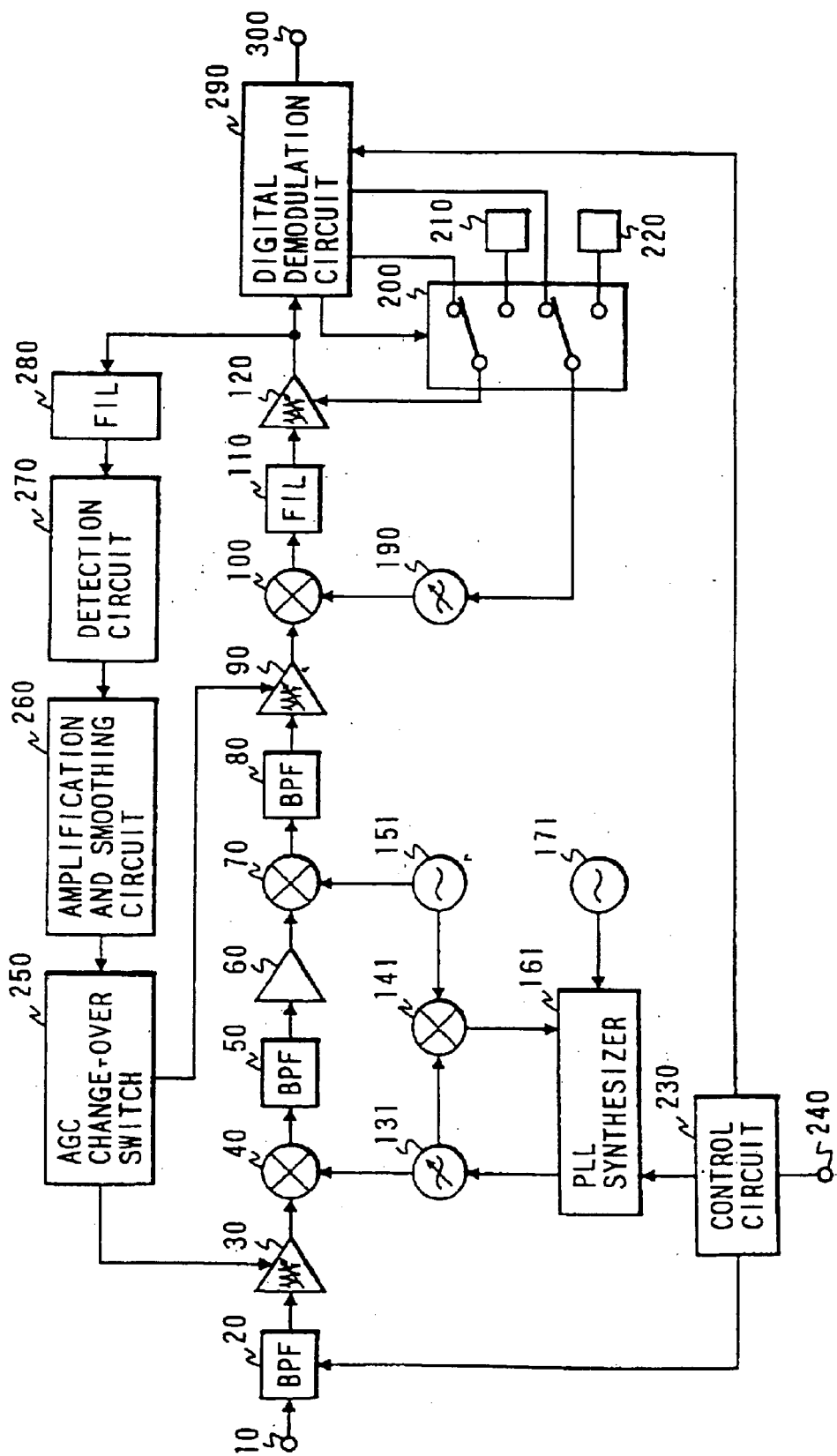
FIG. 3 is a block diagram showing the third embodiment of the high definition TV signal receiver of the present invention.

FIG. 3 is a block diagram showing the third embodiment of the high definition TV signal receiver of the present invention. Numeral 131 indicates a local oscillator, 141 a mixer, 151 a local oscillator, 161 a PLL synthesizer, and 171 a standard oscillator. The same numeral is assigned to each part corresponding to FIG. 1 so as to omit duplicate explanation.

In the drawing, the first local oscillation signal from the local oscillator 131 and the second oscillation signal from the local oscillator 151 are mixed by the mixer 141 and the synthesizer compares a signal having the differential frequency thereof which is divided and an oscillation signal having a stable frequency from the standard oscillator 171 which is divided and controls the oscillation frequency of the local oscillator 131 by the PLL synthesizer 161 so that the error thereof becomes zero.

The local oscillator 131 is controlled by the control circuit 230 and the PLL synthesizer circuit 161 so as to oscillate at the frequency corresponding to the desired channel by a channel selection signal inputted from the input terminal 240. When the dividing ratio in the PLL synthesizer circuit 161 is suitably changed by the control circuit 230, the local oscillator 131 can oscillate at the frequency corresponding to the desired channel.

In this embodiment, in addition to the effect obtained in the first embodiment shown in FIG. 1, the difference between the frequency of the first local oscillation signal and the frequency of the second local oscillation signal is kept constant in the co-channel and the number of PLL synthesizers and standard oscillators can be reduced below the number in the first embodiment.

Figure 4:
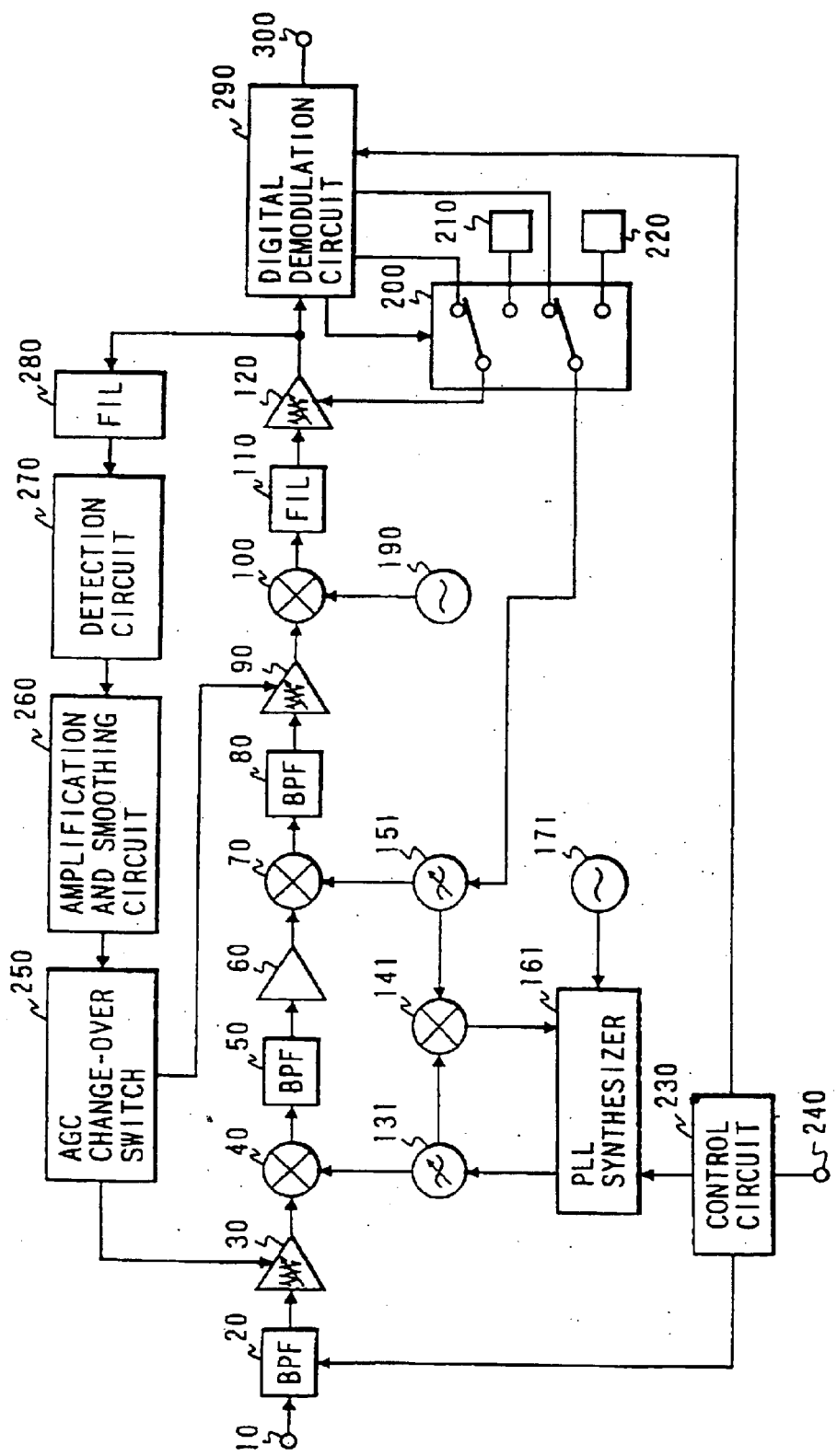
FIG. 4 is a block diagram showing the fourth embodiment of the high definition TV signal receiver of the present invention.

FIG. 4 is a block diagram showing the fourth embodiment of the high definition TV signal receiver of the present invention. The same numeral is assigned to each part corresponding to FIG. 1 so as to omit duplicate explanation. In this embodiment, the oscillation frequency of the local oscillator 151 is finely tuned by an oscillation frequency fine tuning signal from the high definition TV signal demodulator 290.

Figure 5:
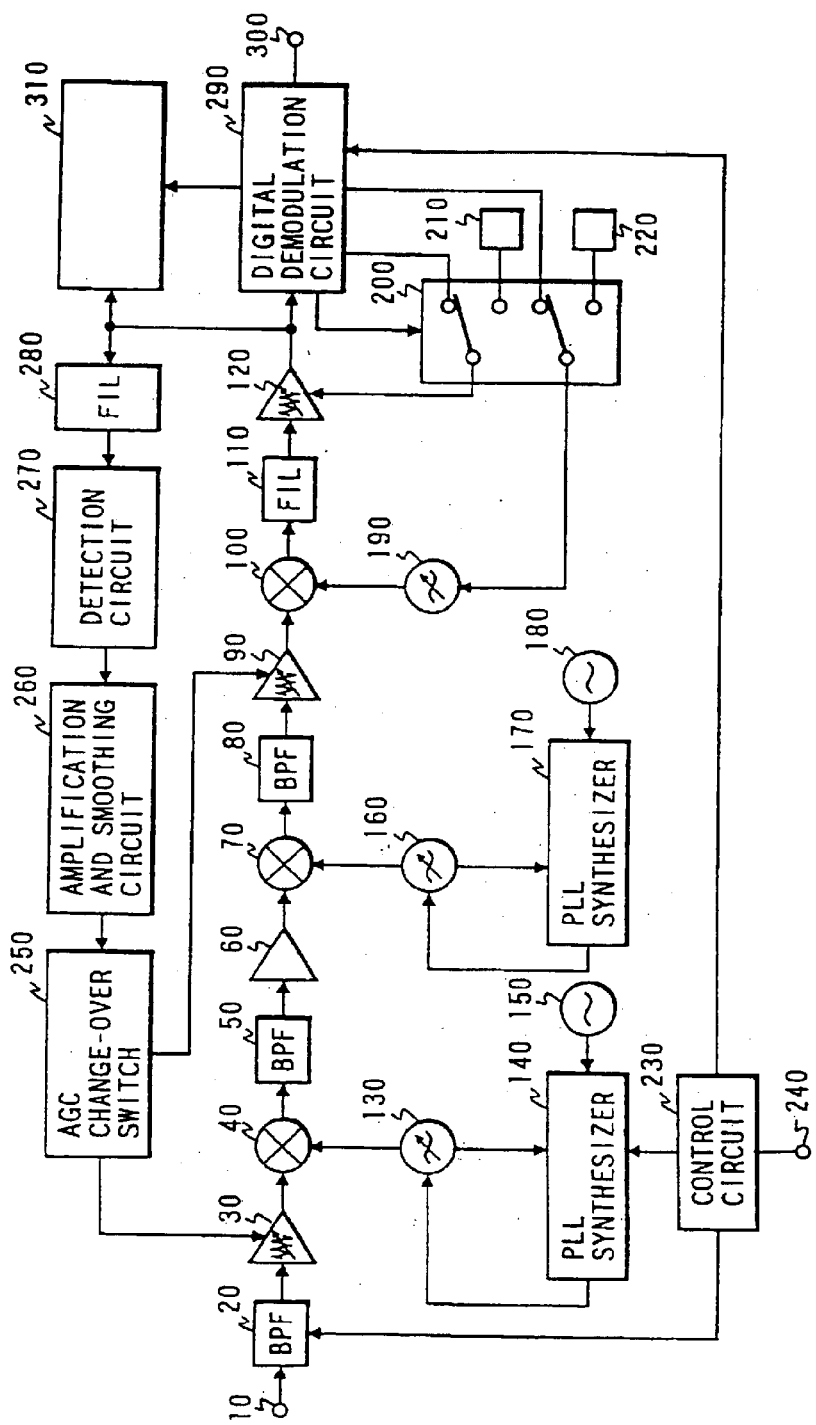
FIG. 5 is a block diagram showing the fifth embodiment of the high definition TV signal receiver of the present invention.

FIG. 5 is a block diagram showing the fifth embodiment of the high definition TV signal receiver of the present invention. Numeral 310 indicates a recording medium and peripheral equipment thereof. The same numeral is assigned to each part corresponding to FIG. 1 so as to omit duplicate explanation.

In the drawing, the recording medium and peripheral equipment thereof 310 consists of a read/write magnetic disk or magnetic optical disk which can record a high definition TV signal or a phase conversion optical disk and a drive circuit therefor.

For current standard TV signals such as NTSC signals, image and sound recorders such as video tape recorders are now widespread. A program which is being viewed or a program which is not being viewed can be recorded while viewing the program and automatic recording can be executed by setting the time. Such recording requires partially changing the base band signal of a standard TV signal such as an NTSC signal, modulating the frequency, and recording it on a magnetic tape. In this case, the signal is subjected to FM modulation at the carrier frequency which is decided from the relative speed between the magnetic tape and magnetic head and the cap length of the magnetic head. Therefore, when the frequency of the third intermediate frequency coincides with a frequency which can be easily modulated, the signal processing unit which is necessary for writing can be simplified. In this case, an FM modulator is installed in the input section of the recording medium and peripheral equipment thereof 310 and an FM demodulator is installed in the output section thereof.

A high definition TV signal has a large amount of information compared with a standard TV signal. However, the frequency band width of the base band signal of the high definition TV signal is the same as that of the standard TV signal due to highly efficient image coding and entropy coding. Therefore, when the high definition TV signal is recorded before it is demodulated to digital data, the efficiency which is almost equal to that of the standard TV signal can be obtained from a viewpoint of storage capacity and images can be recorded for many hours.

When the aforementioned analog image recording mode is added to a high definition TV signal image recorder so as to record images for many hours in addition to the digital image recording mode for recording digital information as it is, it is convenient to recording of images during absences. In the case of analog recording, image degradation may be caused by a temperature change or a change with time of a magnetic tape, magnetic optical disk, or phase conversion optical disk. However, a high definition TV signal is digital information, so that it can be corrected by the error correction technique and the image quality which is equivalent to that of the digital image recording mode can be obtained.

Figure 6:
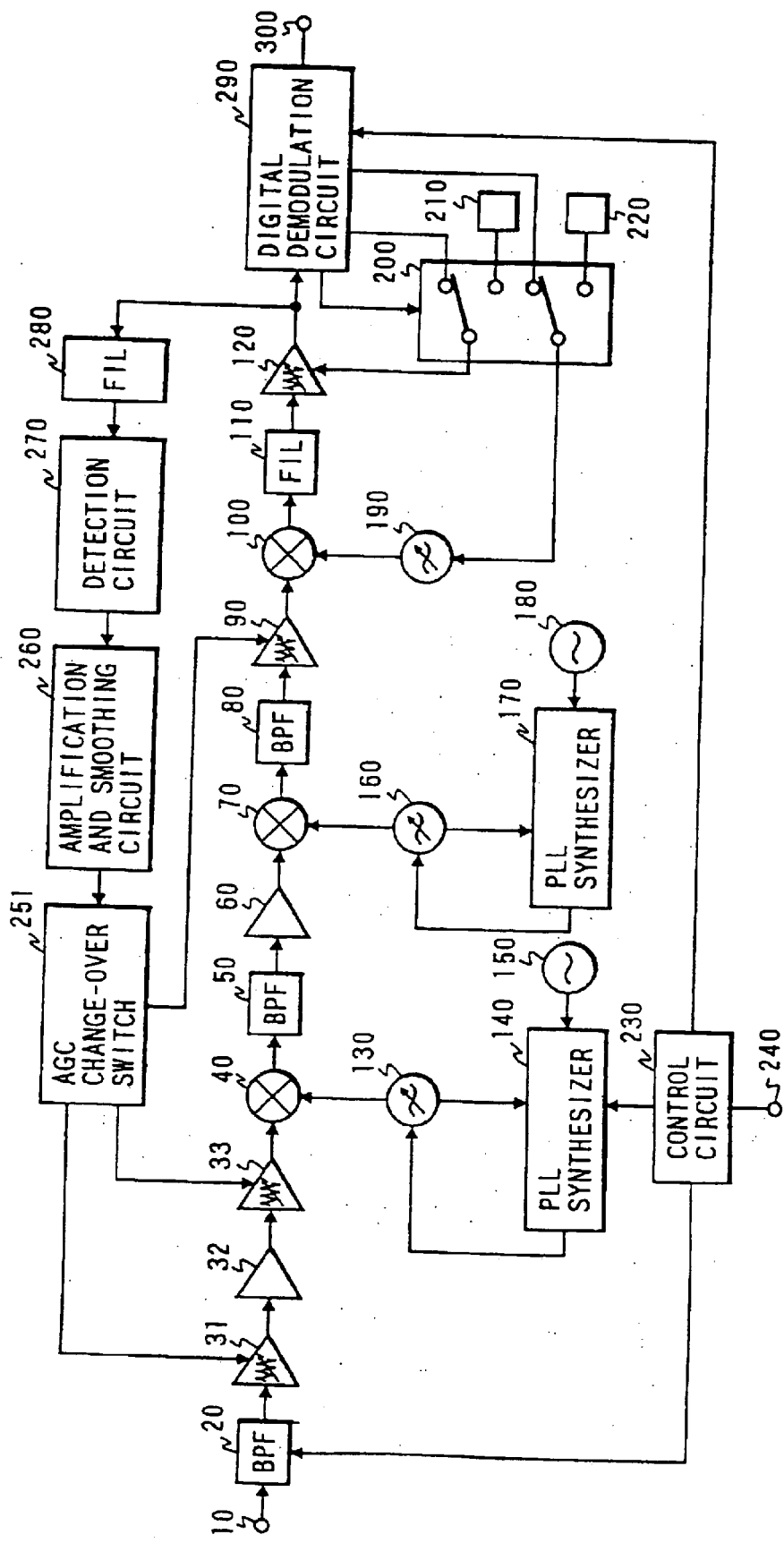
FIG. 6 is a block diagram showing the sixth embodiment of the high definition TV signal receiver of the present invention.

FIG. 6 is a block diagram showing the sixth embodiment of the high definition TV signal receiver of the present invention. Numeral 31 indicates a variable attenuator, 32 an amplifier, 33 a variable attenuator, and 251 an AGC change-over switch. The same numeral is assigned to each part corresponding to FIG. 1.

In the drawing, a TV signal inputted from the input terminal 10 is supplied to the input filter 20 and the band including the desired channel is extracted. An output signal of this input filter 20 is suitably amplified or attenuated by the variable attenuator 31, the amplifier 32, and the variable attenuator 33 and inputted to the mixer 40.

When the level of the input signal is increased, the AGC change-over switch 251 switches and controls a gain control signal from the amplification and smoothing circuit 260 so that the gain attentuation operation starts from the intermediate frequency variable gain amplifier 90 in correspondence with it, and the variable attenuator 33 starts attenuation by leaving the attentuation amount corresponding to the level change such as the aforementioned flutter, and the variable attentuator 31 starts attenuation at the point of time that the attenuation amount is maximized. When the input level is decreased, the AGCF change-over switch 251 switches and controls the gain control signal so that the attentuation amount of the variable attenuator 31 is decreased in correspondence with it, and next the attenuation amount of the variable attenuator 33 is decreased, and finally the gain of the intermediate frequency variable gain amplifier 90 is increased.

When the AGC change-over switch 251 is operated as mentioned above, the noise figure of the whole receiver can be prevented from degradation. At the time of gain attenuation, the degradation of the noise figure can be reduced lower than that in the first embodiment shown in FIG. 1.

Since the variable attenuator is divided and each is delayed and operated, the sensitivity of gain control amount to the AGC voltage can be reduced and a stable AGC operation can be obtained.

Furthermore, when the variable attenuator 31 is installed on the preceding stage of the amplifier 32, even when a TV signal on the maximum input level is inputted to the input terminal 10, mutual modulation interferences and cross modulation interferences can be reduced.

Figure 7:
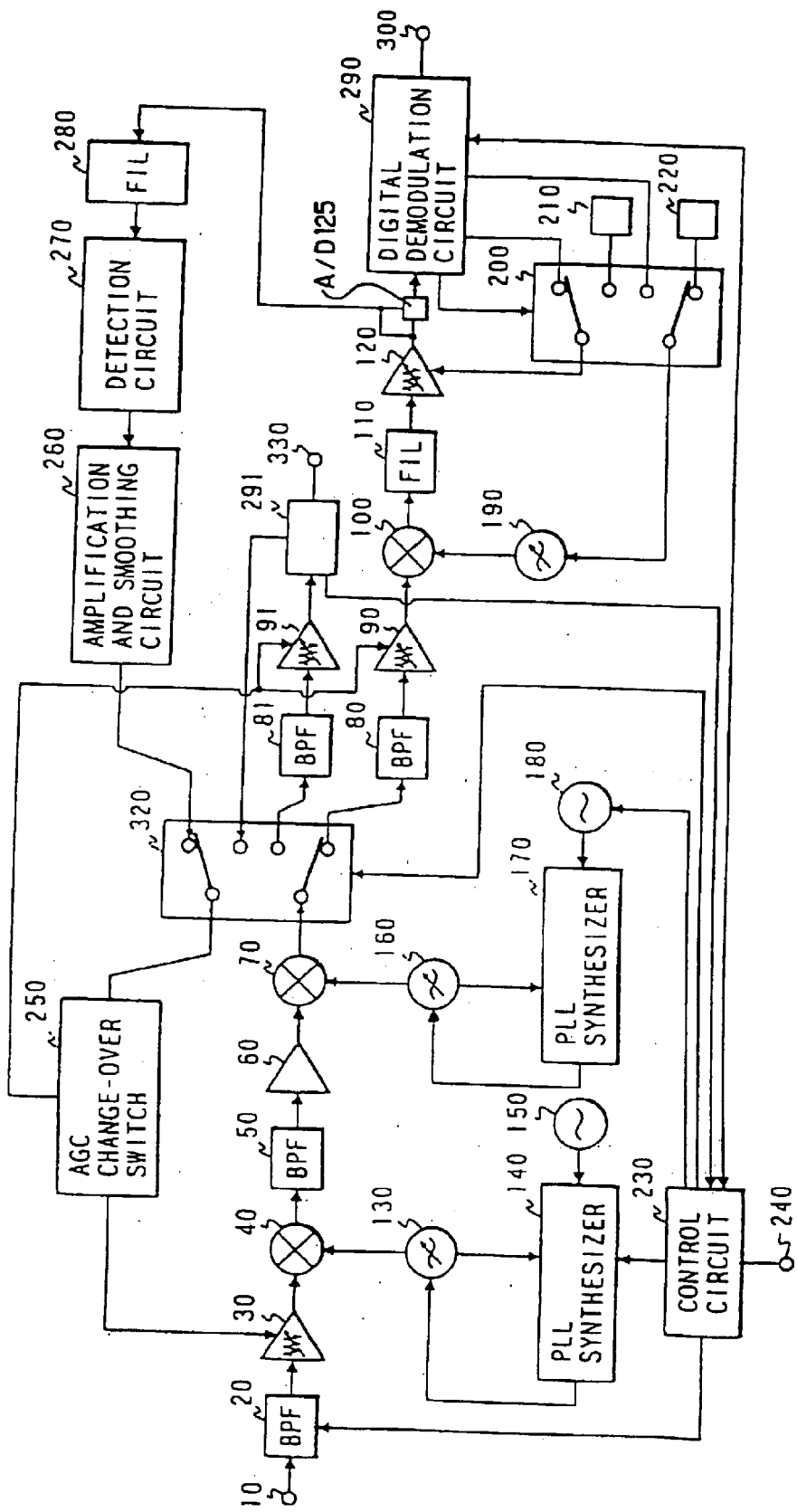
FIG. 7 is a block diagram showing the seventh embodiment of the high definition TV signal receiver of the present invention.

FIG. 7 is a block diagram showing the seventh embodiment of the high definition TV signal receiver of the present invention. Numeral 81 indicates an NTSC signal intermediate frequency filter, 91 an NTSC signal intermediate frequency variable gain amplifier, 291 an NTSC signal demodulator, 320 a change-over switch, and 330 an NTSC signal output terminal. The same numeral is assigned to each part corresponding to FIG. 1. Also illustrated in FIG. 7 is the A/D converter 125 described above in connection with FIG. 1, but not shown. The A/D converter, as previously described, is between amplifier 120 and demodulator circuit 290.

In this embodiment, an NTSC signal and a high definition TV signal can be selectively received.

Namely, in FIG. 7, even when an input TV signal from the input terminal 10 is an NTSC signal which is modulated in amplitude, or a high definition TV signal, or a signal in which an NTSC signal which is modulated in amplitude and a high definition TV signal are multiplexed through the co-channel, according to the channel selected by a viewer, when the channel is an NTSC signal, it is demodulated by the NTSC signal demodulator 291 and outputted from the NTSC signal output terminal 330. When the selected channel is a high definition TV signal, it is demodulated by the high definition TV signal demodulator 290 and outputted from the high definition TV signal output terminal 300.

When a signal in which an NTSC signal which is modulated in amplitude and a high definition TV signal are multiplexed through the co-channel is inputted, it is demodulated by the high-definition TV signal demodulator 290 and outputted from the high definition TV signal output terminal 300. When the high definition TV signal cannot be received due to the Cliff effect in this case, the NTSC signal in the co-channel is automatically demodulated by the NTSC signal demodulator 291 and outputted from the NTSC signal output terminal 330.

Therefore, the intermediate frequency filter 50 is shared by a high definition TV signal and an NTSC signal and a band pass filter having a flatness in pass band and a small deviation of group delay which prevent the demodulation characteristics of a high definition TV signal from degradation is used.

The second intermediate frequency signal, is branched by the reception change-over switch 320 according to the high definition TV signal or the NTSC signal and supplied to the high definition TV signal intermediate frequency filter 80 which consists of an SAW filter or others or the NTSC signal intermediate frequency filter 81 and only the band of the desired receiving channel passes.

When a high definition TV signal is received, it is demodulated by an operation which is the same as that in the embodiment shown in FIG. 1.

On the other hand, when an NTSC signal is received, the second intermediate frequency signal is amplified by the NTSC signal intermediate frequency variable gain amplifier 91 and supplied to the NTSC signal demodulator 291 50 as to be demodulated to an NTSC signal. This NTSC signal consists of video and audio signals of the base band and outputted from the NTSC signal output terminal 330.

When a high definition TV signal is received, the change-over switch 320 is switched to the high definition TV signal receiving side, and the third intermediate frequency signal is branched in the same way as with the embodiment shown in FIG. 1, and only the desired band in the third intermediate frequency signal is extracted by the filter 280, and the signal level thereof is detected by the detection circuit 270 and suitably amplified and smoothed by the amplification and smoothing circuit 260 so as to form a gain control signal. This gain control signal is supplied to the variable gain amplifier 30 or the variable gain amplifier 90 via the AGC change-over switch 250.

When an NTSC signal is received, the change-over switch 320 is switched to the NTSC signal receiving side and a gain control signal which is generated in the NTSC signal demodulator 291 is supplied to the variable gain amplifier 30 or the variable gain amplifier 90 via the AGC change-over switch 250.

When a high definition TV signal is received, an oscillation frequency fine tuning signal is supplied to the local oscillator 190 from the high definition TV signal demodulator 290. However, when an NTSC signal is received, a frequency fine-tuning signal is supplied to the control circuit 230 from the NTSC signal demodulator 291 and by doing this, the control circuit 230 controls so as to finely tune the oscillation frequency of the local oscillator 160.

To reduce the power consumption, it is possible to supply power only to one of the high definition TV signal demodulator 290 and the NTSC signal demodulator 291 according to the received signal.

As explained above, in this embodiment, not only a high definition TV signal but also an NTSC signal can be received and the scale can be reduced by allowing these signals to share a part of the circuit.

Figure 8:
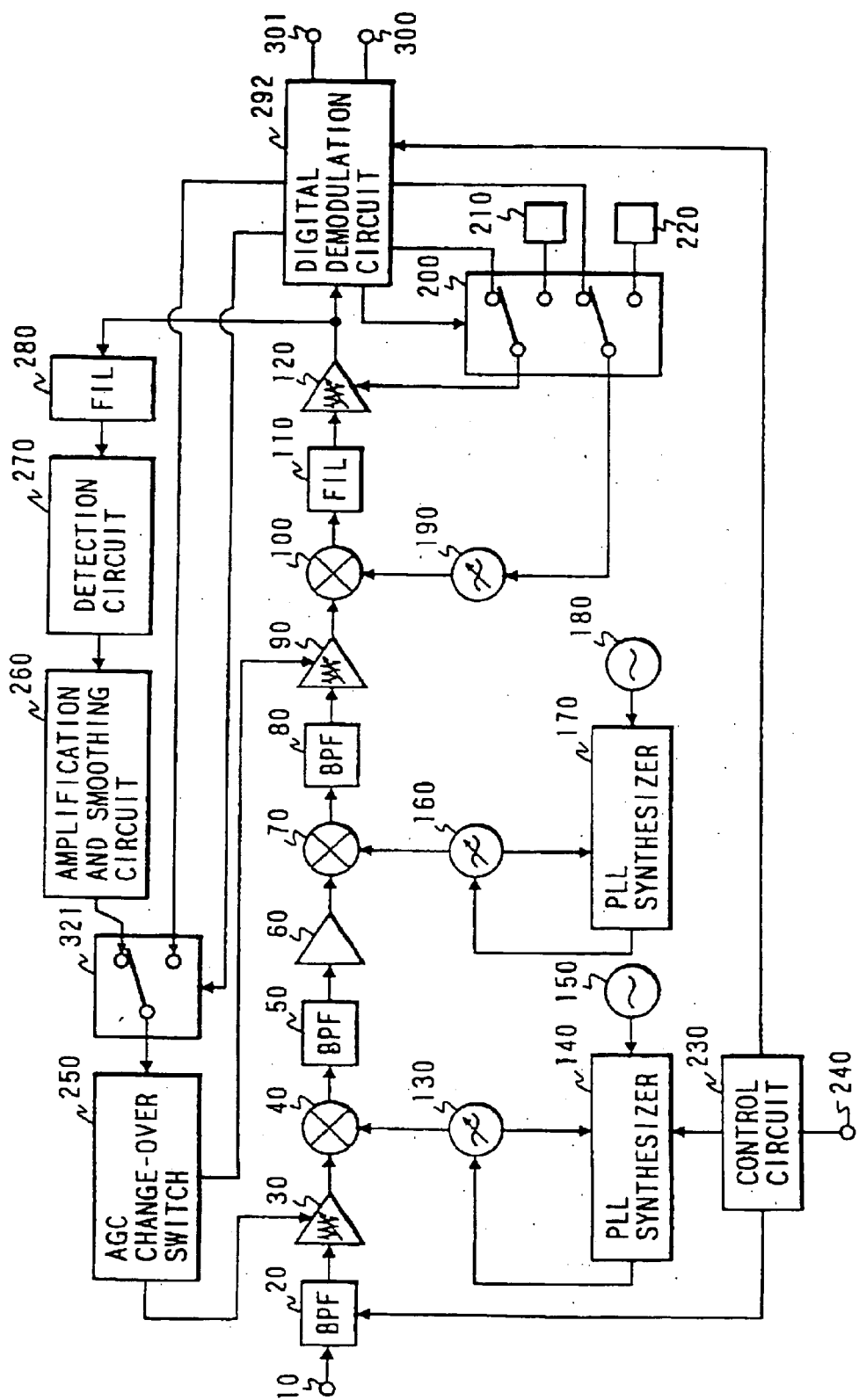
FIG. 8 is a block diagram showing the eighth embodiment of the high definition TV signal receiver of the present invention.

FIG. 8 is a block diagram showing the eighth embodiment of the high definition TV signal receiver of the present invention. Numeral 292 indicates a common demodulation circuit of a high definition TV signal and an NTSC signal, 301 an NTSC signal output terminal, and 321 a change-over switch. The same numeral is assigned to each part corresponding to FIG. 1.

In this embodiment, an NTSC signal and a high definition TV signal can be selectively received in the same way as with the embodiment shown in FIG. 7.

When a high definition TV signal is received in Fig. the change-over switch 321 is switched to the high definition TV signal receiving side. By doing this, the constitution becomes equal to that in the first embodiment shown in FIG. 1 and the same receiving operation is performed.

When an NTSC signal is received, the change-over switch 321 is switched to the NTSC signal receiving side. The intermediate frequency 80 is for a high definition TV signal and the NTSC signal intermediate frequency filter 81 having a special frequency characteristics, as shown in FIG. 7, is not used. Therefore, the embodiment is not suited to handling of an AM modulation signal of the vestigial side-band system such as an NTSC signal.

When an NTSC signal is received, the common demodulation circuit 292 of a high definition TV signal and an NTSC signal generates a base band signal of the NTSC signal using a digital filter. For that purpose, by sharing the digital signal processing operation circuit and memory which are installed for demodulation, data decompression and image processing of a high definition TV signal partially, the circuit scale can be reduced. This digital filter is a band pass filter showing a frequency characteristic which is the same as that of the NTSC signal intermediate frequency filter 81 but the center frequency is different from each other.

When a signal in which an NTSC signal is received and a high definition TV signal is multiplexed through the co-channel, the change-over switch 321 is switched to the high definition TV signal receiving side and the same receiving operation as that in the first embodiment shown in FIG. 1 is performed. When the high definition TV signal cannot be received due to the Cliff effect, the change-over switch 321 is changed to the NTSC signal receiving side so as to automatically receive the NTSC signal in the co-channel.

By doing this, when broadcasting by a high definition TV signal is exactly equal in content to broadcasting by an NTSC signal through the co-channel, even when the high definition TV signal cannot be received, the program during viewing can be continued with pleasure without stopping.

In this case, when the screen frame by the high definition TV signal is perfectly synchronized with the screen frame by the NTSC signal and voice is continued, it is more convenient. Furthermore, in this case, when the horizontal and vertical resolutions of the NTSC signal are made equivalent to those of the high definition TV signal by performing the interpolation processing, the unpleasant feeling when a signal is switched can be reduced.

When it is decided whether there is an error between the screen frame by a high definition signal and the screen frame by an NTSC signal on the broadcasting station side or when any signal for synchronizing the screens is added from the broadcasting station side, by delaying one of the signals for the error; for example, by the memory, they can be synchronized with each other.

When no consideration is given to the aforementioned interframe error by the broadcasting station side, image comparison imposes an extremely heavy burden on the hardware, so that voice of a high definition TV signal and voice of an NTSC TV signal are compared with each other and the magnitude of frame error is calculated. For this calculation, not only voice but also the vertical synchronizing signal of the high definition TV signal and NTSC signal are used. Namely, by using the vertical synchronizing signal, the voice amplitude for each field (or each frame) or the spectrum after high speed Fourier conversion is compared between the high definition TV signal and NTSC signal and the fields (frames) having the greatest correlation are inferred as the same field (frame). By adding the difference in processing time between a high definition TV signal and an NTSC signal in a television set as a parameter beforehand, the number of fields (frames) to be compared is decreased and a result can be inferred more rapidly. This processing may be performed once when the channel is switched.

When voice is continued as mentioned above, a high definition TV signal and an NTSC signal can be synchronized with each other.

As explained above, in this embodiment, not only a high definition TV signal but also an NTSC signal can be received. Furthermore, when a high definition TV signal and an NTSC signal are multiplexed through the co-channel, even when the high definition TV signal becomes unreceivable, a function for automatically receiving the NTSC signal can be added.

When an NTSC signal is digitally demodulated and digitally subjected to image and voice processing, almost all the circuits can be shared by a high definition TV signal and an NTSC signal, and the circuit scale can be reduced substantially and can be made adjustment-free, and a standard TV signal (the PAL system or SECAM system) other than an NTSC signal can be processed by changing the software without adding or changing the hardware.

Furthermore, even when the conventional NTSC signal software resources (video of a movie, a product created by an individual using a video movie, etc.) are incorporated into a computer and any processing is added, an NTSC signal is handled as a digital signal in a television set, so that it is possible only by installing any output terminal (an SCSI interface, etc.).

The effects shown in the embodiments in FIGS. 2, 3, and 4 can be added to each of the embodiments shown in FIGS. 5, 6, 7, and 8. Furthermore, the effect shown in the embodiment in FIG. 6 can be added to each of the embodiments shown in FIGS. 7 and 8.

As explained above, according to the present invention, when the first intermediate frequency filter is shared by a TV signal of the standard system and a high definition TV signal and the second intermediate frequency filter and demodulator are installed in the TV signal of the standard system and high definition TV signal individually, both, the TV signal of the standard system and high definition TV signal can be selectively received. Also the second mixer of the double super-heterodyne system can be shared by these TV signals. Thus, the circuit scale can be reduced.

According to the present invention, when a high definition TV signal received is converted to the third intermediate frequency signal with a frequency lower than that of the second intermediate frequency signal by the third mixer, various signal processing can be executed easily by using an operation amplifier which can process an analog signal with high precision as an amplifier installed on the subsequent stage of the third mixer or by converting an analog signal to a digital signal. Even when a TV signal of the standard system and a high definition TV signal are multiplexed and transmitted through the co-channel, the cross Modulation by these TV signals can be reduced and hence a high definition TV signal at a low error rate can be demodulated. Furthermore, according to the present invention, when a high definition TV signal is converted to the aforementioned third intermediate frequency signal, the frequency of signals handled by the high definition TV signal demodulator is reduced, so that the circuit constitution is simplified.

Furthermore, according to the present invention, when a TV signal of the standard type is digitally demodulated, a receiver shared by a small amount of general purpose high definition TV signals and TV signals of the standard system of the analog circuit can be configured. When a TV signal of the standard system and a high definition TV signal are multiplexed and transmitted through the co-channel in this case, even when the high definition TV signal becomes unreceivable, the receiver can be automatically switched so as to receive the TV signal of the standard system.

To detect the gain control signal of the first variable gain amplifier or the second intermediate frequency variable gain amplifier, when a TV signal of the standard system and a high definition TV signal are multiplexed and transmitted through the co-channel, by eliminating the carrier part with high energy in the TV signal of the standard system by a filter, an error operation of gain control by the TV signal of the standard system can be avoided when a high definition TV signal is received and the high definition TV signal can be demodulated satisfactorily.

What is claimed is:

1. A digital broadcast receiver capable of receiving digitally modulated television signals in which plurality of channels are multiplexed, said receiver comprising:

a receiver unit which receives a data-compressed and digitally modulated television signal, the bandwidth of said television signal being equal to that of NTSC system;

a first frequency converter which converts a received digitally modulated television signal into a first intermediate frequency signal having a frequency lower than that of the received television signal, said first intermediate frequency signal having a frequency used in demodulating a signal in NTSC system;

a band-pass filter coupled to the first frequency converter, which selectively passes through the first intermediate frequency signal;

a phase-lock loop (PLL) circuit coupled to the first frequency converter, which controls an oscillation frequency of a local oscillator in said first frequency converter;

a second frequency converter coupled to the band-pass filter, which converts the first intermediate frequency signal passed through said band-pass filter into a second intermediate frequency signal lower in frequency than said first intermediate frequency signal;

a digital demodulator coupled to the second frequency converter, which demodulates the second intermediate frequency signal which is converted by said second frequency converter;

a data decompressed which expands the demodulated signal, wherein the second intermediate frequency signal has a frequency which is almost coincident with a symbol rate of the digitally modulated television signal.

2. The receiver according to claim 1, wherein said first intermediate frequency signal has a frequency band of 45 MHz.

3. The receiver according to claim 1, wherein said first intermediate frequency signal has a frequency band of 58 MHz.

4. The receiver according to claim 1, wherein said band-pass filter includes a surface acoustic wave (SAW) filter.

5. The receiver according to claim 1, wherein said second intermediate frequency signal has a frequency substantially equal to a symbol rate of said digital TV signal.

6. The receiver according to claim 1, wherein said second intermediate frequency signal has a frequency which can be easily modulated.

7. The receiver according to claim 1, wherein said second intermediate frequency signal has a frequency which can be easily converted an analog signal to a digital signal.

8. The receiver according to claim 1, further comprising a writer coupled to the digital demodulator, which records the demodulated signal demodulated signal demodulated by said digital demodulator on a recording medium.

9. The receiver according to claim 8, wherein said recording medium is a magnetic tape and the recorder is a video tape recorder.

10. The receiver according to claim 8, wherein said recording medium is a magnetic optical disk and the recorder is a disk recorder.

11. The receiver according to claim 8, wherein said recording medium is a phase conversion optical disk and the recorder is a disk recorder.

12. The receiver according to claim 8, wherein said recording medium is a magnetic tape and the recorder is a video tape recorder.

13. The receiver according to claim 8, wherein said recording medium is a magnetic optical disk and the recorder is a disk recorder.

14. The receiver according to claim 8, wherein said recording medium is a phase conversion optical disk and the recorder is a disk recorder.

15. The receiver according to claim 1, wherein said digital television signal includes a high definition television signal.

* * * * *

UNITED STATES PATENT AND TRADEMARK OFFICE
CERTIFICATE OF CORRECTION

PATENT NO. : 6,909,470 B2
DATED : June 21, 2005
INVENTOR(S) : Hiroyuki Mizukami et al.

It is certified that error appears in the above-identified patent and that said Letters Patent is hereby corrected as shown below:

Column 3,
Line 45, change "from" to -- with --.
Line 48, after "oscillator 130" insert -- so --.

Column 4,
Line 18, change "from" to -- with --.

Column 5,
Line 33, change "is, extracted" to -- is extracted --.

Column 6,
Line 38, change "even 20 when" to -- even when --.

Column 9,
Line 44, change "demodulator 291 50 as" to -- demodulator 291 as --.

Column 11,
Line 12, change "the error;" to -- the error, --.

Column 12,
Line 18, change "Modulation" to -- modulation --.

Column 13,
Line 10, change "decompressed" to -- decompressor --.

Column 14,
Line 3, after "converted" insert -- from --.

UNITED STATES PATENT AND TRADEMARK OFFICE
CERTIFICATE OF CORRECTION

PATENT NO.    : 6,909,470 B2
DATED         : June 21, 2005
INVENTOR(S)   : Hiroyuki Mizukami et al.

It is certified that error appears in the above-identified patent and that said Letters Patent is hereby corrected as shown below:

Column 14 (cont'd),
Line 6, delete "demodulated signal" (second occurrence).

Signed and Sealed this

Fourth Day of October, 2005

JON W. DUDAS
*Director of the United States Patent and Trademark Office*